July 15, 1947.  F. C. FRANK  2,423,882
DISK BRAKE
Filed Aug. 6, 1942  3 Sheets-Sheet 1

INVENTOR
FREDERICK C. FRANK
BY
 Jn. W. McConkey
ATTORNEY

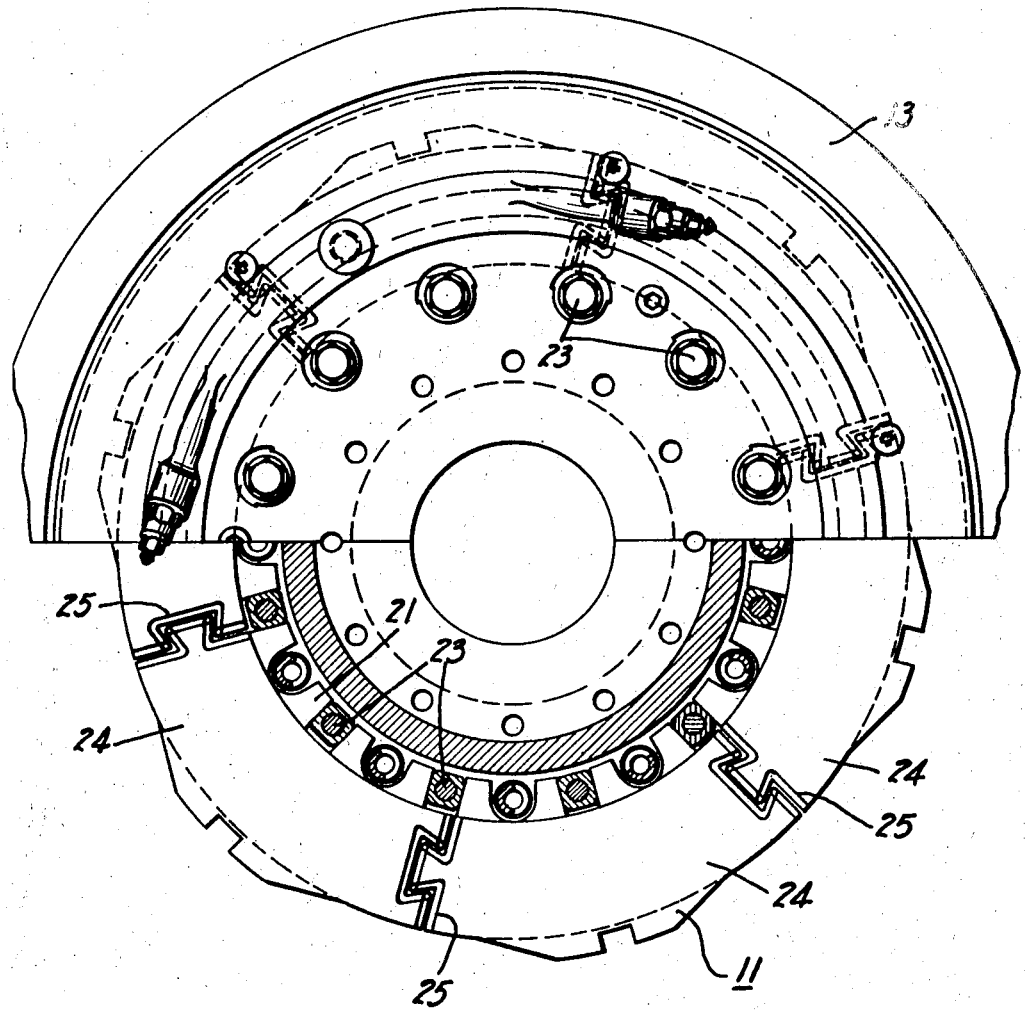

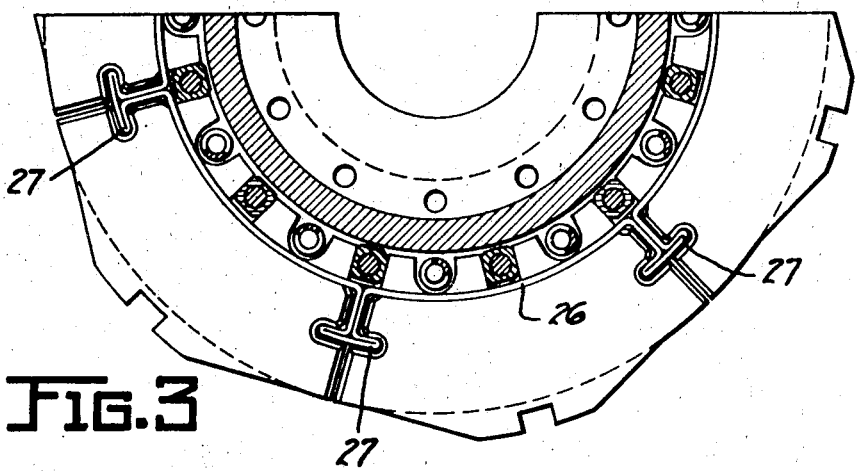
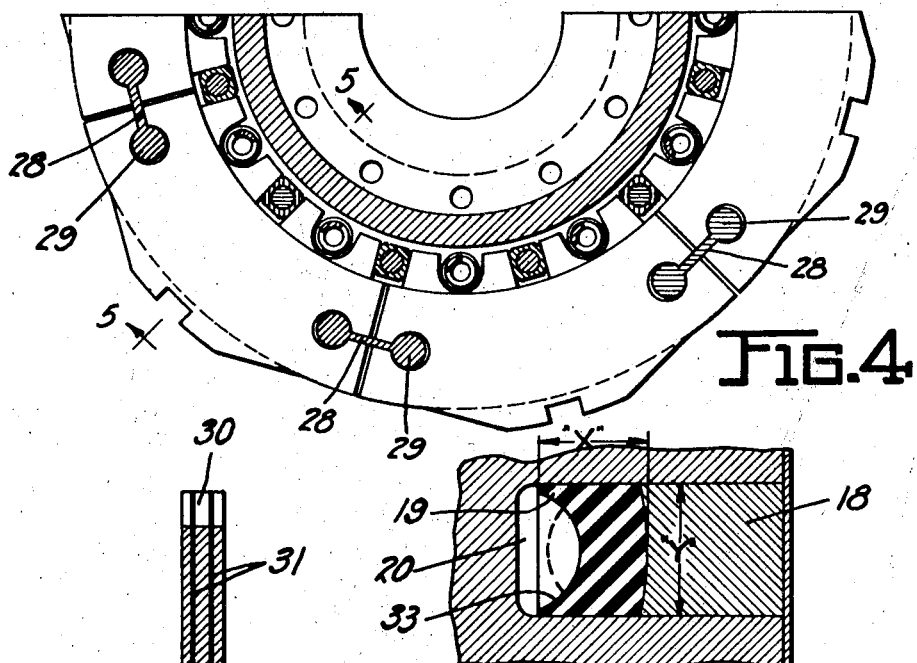
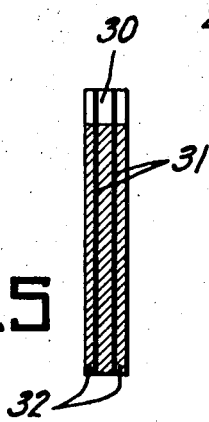
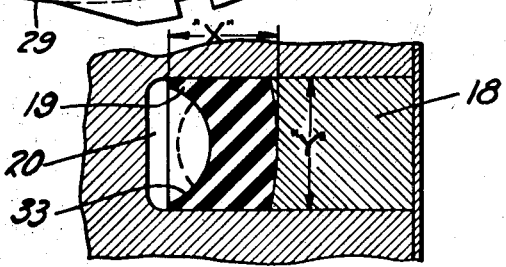

Patented July 15, 1947

2,423,882

UNITED STATES PATENT OFFICE 2,423,882

DISK BRAKE

Frederick C. Frank, South Bend, Ind., assignor to Bendix Aviation Corporation, South Bend, Ind., a corporation of Delaware Application August 6, 1942, Serial No. 453,797

7 Claims. (Cl. 188—72)

This invention relates to new and useful improvements in disk brakes. Among its objects are: (1) the provision of an improved sealing means for an annular piston-containing chamber, (2) the forming of a rotor for a disk brake having the optimum combination of strength and friction creating propensity, and (3) the suggestion of improved methods for preventing the segments of a segmented disk from excessive displacement relative to one another.

For efficient operation of a disk brake, it is desirable that the applying pressure be evenly distributed around the annular surface of the disk against which the pressure is directly applied. To accomplish this purpose, I prefer to utilize a structure known in the art, the structure including a support having an annular chamber formed therein and an annulus or annular piston reciprocable therein. In such an assembly, the provision of satisfactory sealing means for preventing loss of fluid from the chamber has always been a problem of prime importance. My solution of the problem, which has been quite successful, consists in the utilization of an annular seal which is substantially square in cross section except for a groove of rather slight depth on the side against which pressure of the hydraulic liquid is to be exerted.

I have further improved the performance of a disk brake by forming a rotor which, in cross section, comprises a central strength member of steel and a friction metal such as powdered iron bonded to the steel on each side by a non-ferrous metal or alloy.

In a brake having a friction disk which comprises a plurality of separated or disconnected segments and which therefore requires means for maintaining segments in proper position relative to one another, I have included effective means for so maintaining the position of the segments. Such maintaining means, it will be appreciated are variations upon the maintaining means disclosed in the application of W. H. DuBois, Serial No. 449,722, filed July 4, 1942.

Other features and purposes of my invention will be apparent during the following description, reference being had therein to the accompanying drawings, in which:

Figure 2 is a view part in elevation and part in vertical section taken on a plane normal to the section of Figure 1 and showing one of the improved means for maintaining the disk segments in proper relative position;

Figures 3 and 4 are sections showing modifications of the means for maintaining the segments in position;

Figure 5 is a section taken on the line 5—5 of Figure 4 which shows a close-up of the cross section of the rotor formed according to the second object of the invention; and Figure 6 is a section showing in close-up the improved sealing means illustrated in Figure 1.

Figure 1:
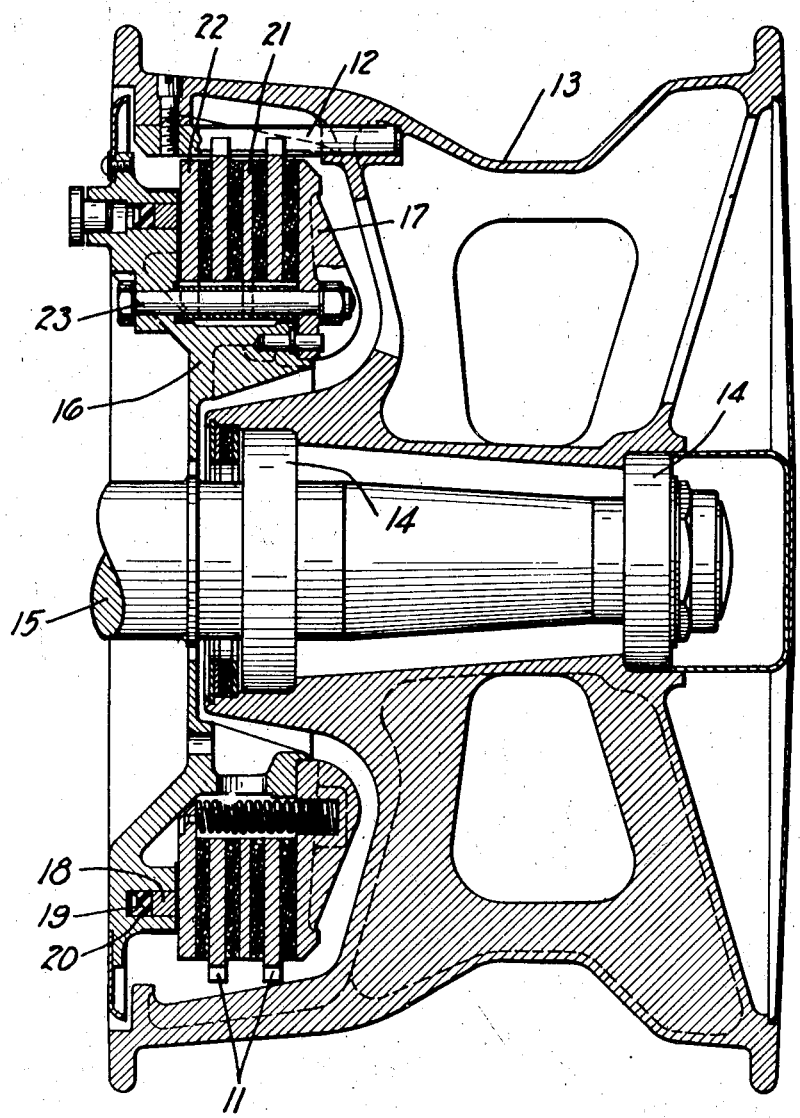
Figure 1 is a vertical section taken through a wheel and brake assembly incorporating my invention.

The disk brake of Figures 1 and 2 includes a plurality of rotor friction members 11 keyed by a plurality of cross rods 12 to a rotatable wheel 13, the wheel being supported by bearings 14 on a non-rotatable axle 15. Fixed to the axle is a support 16 which serves to position the stator friction members. A stator disk 17 is fixed to the support and serves as a wall against which the various friction members may be compressed by axial movement of a fluid pressure responsive annular piston 18 sealed by a resilient annulus 19 and reciprocable in an annular chamber 20 formed in the support 16 and having a connection to a fluid pressure source.

As shown the stator friction members are lined with a non-metallic material having a high coefficient of friction. Such a lining is secured to the inner surface of disk 17, to both sides of a stator disk 21 which is between the rotors, and to the inner surface of a pressure stator disk 22 which abuts the piston 18. Stator disks 17, 21, and 22 are all mounted on bolts 23 which prevent them from rotation relative to support 16 and the axle 15.

The rotors each comprise a plurality of separated segments 24 which are articulated (as seen in Figure 2) by dovetail joints each including a wedge-shaped side projection 25 on one of the segments and a complementary wedge-shaped pocket in the next segment into which the projection fits. The fit of the dovetailed joints is loose to allow free expansion of the segments under the influence of heat or stressing tendencies. At the same time the dovetail joints prevent excessive displacement of the segments radially or circumferentially with respect to one another. This is particularly important for holding the segments in place when the rotors are being assembled or disassembled with the brake. The circumferential length of each segment comprises only that portion of the complete rotor having one key slot on its outer diameter for receiving one of the cross rods or keys 12. This arrangement serves to eliminate any tendency of the segments to get out of alignment, due to unequal spacing of the key slots in the rotor or key rods in the wheel. Thus are accomplished reduction of rotor cracking and equal distribution of the load through each segment.

In Figure 3 the rotor segments are maintained in proper relative position by a ring 26 on the inner diameter of the rotor, which ring has T-shaped outwardly extending projections 27 at each confluence of the segments, the oppositely extending sides of the T-head projecting into complementary clearance permitting grooves in the sides of the segments. A beneficial result of use of the ring 26 is that any tendency toward tilting of the individual segments due to torque when the brake is applied cannot cause the segments to catch on any stationary portion of the brake around the inside diameter of the rotor.

In Figure 4 the rotor segments are maintained in proper relative position by a plurality of solid connecting links 28 each of which has enlarged end portions 29 fitting into pockets in the adjacent segments. In order to permit relatively free expansion of the segments, without placing a strain on the metal, there should be a slight clearance between the connecting link end portions 29 and the pockets into which they fit.

Figure 5 shows one of the rotors in cross section. It comprises a central steel portion 30 which serves as a strength member and to an extent as a heat reservoir, thin layers 31 of non-ferrous bonding metal on each side of the central portion 30, and outside friction portions 32 which are preferably made of powdered iron. The powdered iron has relatively high friction creating characteristics and is therefore desirable for the outside annular surfaces of the rotor. But powdered iron has insufficient strength to take the whole torque load. Steel, on the other hand has a relative low coefficient of friction because of its smooth surface, but a high strength factor. The combination of the two ferrous metals bonded together by a non-ferrous bonding metal has proved eminently satisfactory in the make-up of friction disks for the brake disclosed in this application.

Figure 6 shows the piston, piston chamber, and seal of Figure 1 in close-up. Due to the large size of seal necessitated by an annular fluid chamber of the type shown and the fact that the sides of the seal must accommodate different diameter cylinder walls, considerable difficulty has been experienced with seal failure and resultant leakage. One of the problems is twisting of the seal so that it assumes a wavy or distorted shape with the result that one of its lips, usually the inner diameter lip, leaves the cylinder walls and permits escape of the fluid. Another problem is occasioned by the tendency of the resilient seal to swell under the influence of heat or of the hydraulic liquid used in the brake system.

To meet the rather rigorous requirements of performance for seals of this type, I have designed a seal which departs in certain important particulars from those previously used, and which is claimed in my divisional application Serial No. 473,193, filed January 22, 1943. Referring to the cross section of the seal 19 in Figure 6, it will be seen that I have made the thickness "$x$" of the seal measured from the top of the lip to base approximately equal to the radial width "$y$" of the seal. The dimensions need not be exactly equal but their ratio should approximate 1:1. This dimensional ratio prevents turning or twisting of the seal relative to the piston and chamber.

To form lips on the inner and outer diameters of the seal, I cut a shallow groove 33 in the fluid pressure receiving face of the seal. The depth of the groove is approximately one-third the total thickness "$x$" of the seal. It is preferable that the groove be cut on the arc of a circle having its center on a line bisecting the cross sectional body of the seal. The advantage of cutting the groove along a uniformly curved line is that the maximum or optimum inner lip surface which will be subjected to the outward pressure of the fluid and the sharpest practicable feather-edge lip can be combined with the maximum or optimum tendency of the resilient body of the seal itself to force the lip against the cylinder wall. It is desirable, if possible, to have the lips pressed against the wall by the inherent resiliency of the seal itself instead of depending on fluid pressure alone for sealing. This is particularly true of an annulus as compared to a cup seal because swelling of the annulus as a whole tends to draw the inner diameter of the seal away from its wall and swelling may occur when the pressure of the fluid in the system is insufficient to maintain a seal.

It is advantageous, in addition to the above, to have the bottom surface of the seal and the contacting surface of the piston cut with a very shallow groove which is the arc of a circle.

As swelling of the seal tends to change its volume, a bulge having somewhat the shape indicated by the dotted line in Figure 6 may be forced by confinement of the base and both sides of the seal. It will be noted that the bulge of the seal in Figure 6 will exert an outward pressure on the lips tending to improve the sealing of the lips. In the case of the common cup section seal, the swelling of the seal base tends to draw the lips of the seal inwardly and destroy their effectiveness.

Although certain specific embodiments of my invention have been described for illustrative purposes, it is not my intention to limit the scope of my invention to such embodiments or to limit such scope otherwise than by the terms of the following claims.

I claim:

1. A friction disk comprising a plurality of separate segments which are dovetailed to one another to furnish mutual radial support to prevent excessive relative displacement while allowing clearance between the individual segments for their expansion under the influence of heat, each of said segments having a wedge-shaped projection at one end and a wedge-shaped opening at the other end for receiving the projection of the next segment.

2. A friction disk comprising a plurality of separate segments, and supporting means for the segments arranged to furnish mutual radial and circumferential support to prevent excessive relative displacement while allowing clearance between the individual segments for their expansion under the influence of heat, said supporting means comprising a plurality of solid links having enlargements at both ends, each enlargement fitting loosely into a pocket in one side of one of the segments.

3. A friction member for disk brakes, and the like, comprising an interrupted disk member composed of contiguous disk sections having their adjacent ends spaced apart for a distance sufficient to allow for thermal expansion of the disk, and means for assembling said sections in disk form, with the ends of said sections spaced as aforesaid, comprising a projecting portion at one end of each segment extending loosely into an opening formed in the next segment.

4. A friction disk comprising a plurality of separate segments connected to one another by means of loose dovetailing to furnish mutual radial and circumferential support to prevent excessive relative displacement while allowing clearance between the individual segments for their expansion under the influence of heat, each of said segments having an inverse wedge-shaped extending portion at one end and a wedge-shaped pocket at the other end for receiving the extending portion of the adjacent segment.

5. A friction disk comprising a plurality of separate segments spaced from one another sufficiently to permit individual thermal expansion of the segments, each of said segments having an integral projecting portion at one end thereof extending loosely into an opening formed in the adjacent segment, whereby said segments furnish one another mutual radial support.

6. A friction disk comprising a plurality of separate segments spaced from one another sufficiently to permit individual thermal expansion of the segments, each of said segments having an integral projecting portion at one end thereof extending into an opening formed in the adjacent segment, whereby said segments furnish one another mutual radial support.

7. In a disk brake assembly having a plurality of axially-extending torque-transmitting keys, a friction disk comprising a plurality of separate segments, each having a notch receiving one of said torque-transmitting keys, and supporting means for the segments to furnish mutual radial and circumferential support to prevent excessive relative displacement, while allowing clearance between the individual segments for their expansion under the influence of heat, said supporting means comprising a plurality of non-resilient members loosely interconnecting each segment with the two adjacent segments, said torque-transmitting keys and said supporting means constituting the sole means for maintaining the segments in position in the assembled brake.

FREDERICK C. FRANK.

REFERENCES CITED

The following references are of record in the file of this patent:

UNITED STATES PATENTS

| Number | Name | Date |
| --- | --- | --- |
| 2,208,620 | Baisch | July 23, 1940 |
| 2,255,024 | Eksergian | Sept. 2, 1941 |
| 2,095,816 | Johansen | Oct. 12, 1937 |
| 2,259,461 | Eason | Oct. 21, 1941 |